(12) United States Patent
Chen

(10) Patent No.: US 10,016,817 B2
(45) Date of Patent: Jul. 10, 2018

(54) VIBRATION ABSORPTION CUTTER HOLDER

(71) Applicant: Chin-Chiu Chen, Taichung (TW)

(72) Inventor: Chin-Chiu Chen, Taichung (TW)

( * ) Notice: Subject to any disclaimer, the term of this patent is extended or adjusted under 35 U.S.C. 154(b) by 0 days.

(21) Appl. No.: 15/652,666

(22) Filed: Jul. 18, 2017

(65) Prior Publication Data
US 2017/0312832 A1   Nov. 2, 2017

Related U.S. Application Data

(63) Continuation of application No. 14/989,258, filed on Jan. 6, 2016.

(51) Int. Cl.
*B23B 31/20* (2006.01)
*B23Q 11/00* (2006.01)

(52) U.S. Cl.
CPC .......... *B23B 31/20* (2013.01); *B23Q 11/0032* (2013.01); *B23B 2222/92* (2013.01); *B23B 2231/2008* (2013.01); *B23B 2231/36* (2013.01); *B23B 2250/16* (2013.01)

(58) Field of Classification Search
CPC ................ B23B 31/20; B23B 2222/92; B23B 2231/2008; B23B 2250/16; B23B 2231/36; B23B 31/201; B23Q 11/0032
See application file for complete search history.

(56) References Cited

U.S. PATENT DOCUMENTS

| 3,207,009 | A | * | 9/1965 | Carlstedt | B23B 29/022 188/380 |
| 4,640,653 | A | * | 2/1987 | Schartzman | B23B 31/207 408/239 R |
| 8,714,893 | B2 | * | 5/2014 | Taguchi | B23B 31/201 408/143 |

* cited by examiner

*Primary Examiner* — Daniel Howell
*Assistant Examiner* — Paul M Janeski
(74) *Attorney, Agent, or Firm* — Lerner, David, Littenberg, Krumholz & Mentlik, LLP

(57) ABSTRACT

A cutter holder has a body, a fastening bolt, and a vibration absorbing structure. The body has a specific weight. The fastening bolt is mounted inside the body. The vibration absorbing structure is mounted inside the body and has a sleeve, an elastic unit, a spacer, and a set nut. The sleeve is mounted around the fastening bolt and has a specific weight. The specific weight of the sleeve is larger than the specific weight of the body. The elastic unit is mounted around the fastening bolt and has two opposite ends. One of the ends of the elastic unit abuts against the sleeve. The spacer is mounted around the fastening bolt and abuts against the other end of the elastic unit. The set nut is screwed with the fastening bolt and abuts against the spacer.

6 Claims, 5 Drawing Sheets

VIBRATION ABSORPTION CUTTER HOLDER

CROSS-REFERENCE TO RELATED APPLICATION

This application is a continuation-in-part of U.S. application Ser. No. 14/989,258, filed on Jan. 6, 2016, the disclosure of which is incorporated herein by reference.

BACKGROUND OF THE INVENTION

1. Field of the Invention

The present invention relates to a machine tool, and more particularly to a cutter holder that can absorb vibration caused by machining.

2. Description of Related Art

A cutter holder is a tool for machining. With reference to FIG. 4, a conventional cutter holder 80 comprises a body 81, a collet 82, a cutter 83, a fastening bolt 84, and a set screw 85. The body 81 has a first end and a second end opposite the first end. The collet 82 is mounted in the first end of the body 81. The cutter 83 is mounted in the collet 82. The fastening bolt 84 is screwed in the body 81 and is adjacent to the second end of the body 81. The conventional cutter holder 80 inevitably generates vibration during machining. The vibration has little influence on processing quality when utilizing cutter holders with shorter lengths. However, for certain cutter holders with longer lengths, the vibration forms obvious marks of machining and a rough surface on a work piece. The conventional cutter holder 80 lacks vibration absorbing structures and consequently is not suitable for larger work pieces.

To overcome the shortcomings of the conventional cutter holder, the present invention provides a vibration absorption cutter holder to mitigate or obviate the aforementioned problems.

SUMMARY OF THE INVENTION

The main objective of the present invention is to provide a vibration absorption cutter holder that can absorb vibration caused by machining and perform high-quality machining.

The cutter holder comprises a body, a fastening bolt, and a vibration absorbing structure. The body has a specific weight. The fastening bolt is mounted inside the body. The vibration absorbing structure is mounted inside the body and has a sleeve, an elastic unit, a spacer, and a set nut. The sleeve is mounted around the fastening bolt and has a specific weight. The specific weight of the sleeve is larger than the specific weight of the body. The elastic unit is mounted around the fastening bolt and has two opposite ends. One of the ends of the elastic unit abuts against the sleeve. The spacer is mounted around the fastening bolt and abuts against the other end of the elastic unit. The set nut is screwed with the fastening bolt and abuts against the spacer.

Other objects, advantages, and novel features of the invention will become more apparent from the following detailed description when taken in conjunction with the accompanying drawings.

DETAILED DESCRIPTION OF PREFERRED EMBODIMENT

Figure 1:
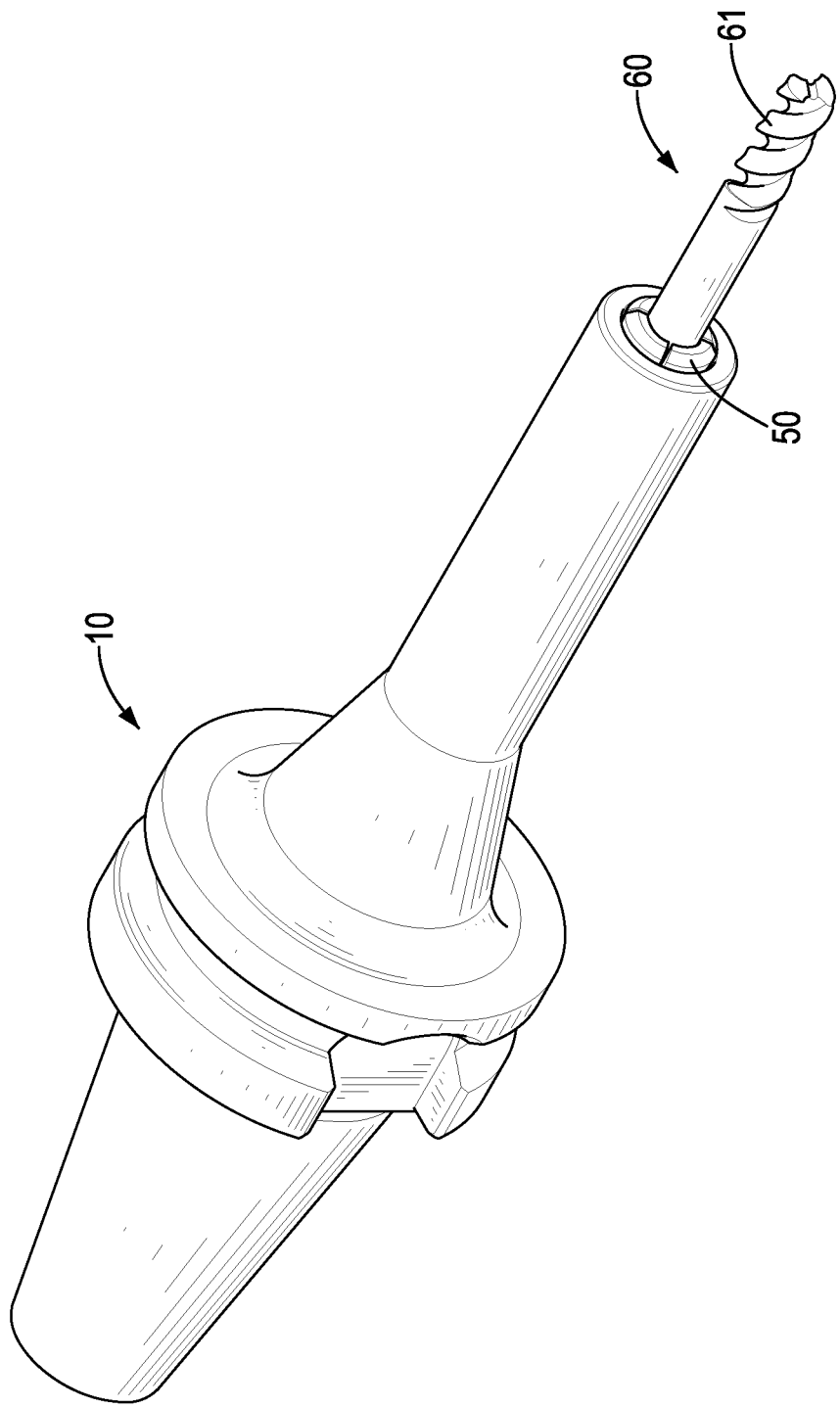
FIG. 1 is a perspective view of a vibration absorption cutter holder in accordance with the present invention.

With reference to FIGS. 1, 2A, 2B, and 3, a vibration absorption cutter holder in accordance with the present invention comprises a body 10, a fastening bolt 20, a set screw 30, a vibration absorbing structure 40, a collet 50, and a cutter 60. The fastening bolt 20, the set screw 30, and the vibration absorbing structure 40 are mounted inside the body 10. The collet 50 is assembled on the body 10.

With reference to FIGS. 1, 2A, 2B, and 3, the body 10 has a specific weight, a clamping end, a cutting end, a through hole 11, a receiving hole 12, and a connecting hole 13. The through hole 11 is axially formed in the clamping end of the body 10. The through hole 11 has a diameter, an inner surface, and an inner thread formed on the inner surface of the through hole 11. The inner thread of the through hole 11 is adjacent to the clamping end of the body 10. The receiving hole 12 is axially formed in the cutting end of the body 10. The receiving hole 12 has an inner surface, a first end, a second end, and a receiving groove 121. The first end of the receiving hole 12 corresponds in position to the cutting end of the body 10 and is conical. The second end of the receiving hole 12 is opposite to the first end of the receiving hole 12. The second end of the receiving hole 12 has a diameter. The receiving groove 121 is annularly formed in the inner surface of the receiving hole 12 and is adjacent to the cutting end of the body 10. A seal is mounted in the receiving groove 121. The connecting hole 13 is axially formed in the body 10 and communicates with the through hole 11 and the receiving hole 12. The connecting hole 13 has a diameter. The diameter of the connecting hole 13 is smaller than the diameters of the through hole 11 and the second end of the receiving hole 12.

Figure 2:
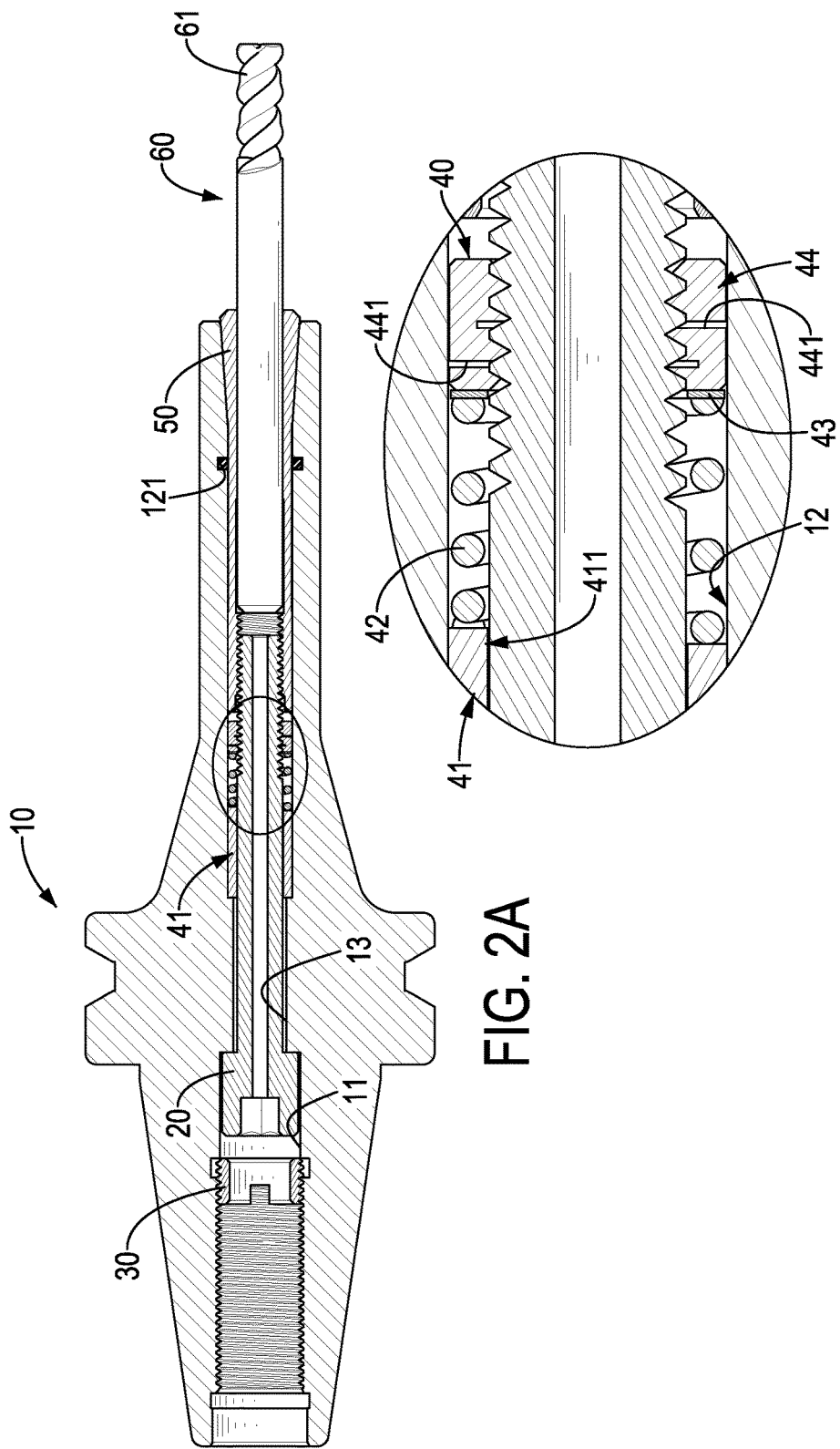
FIG. 2A is a side view in partial section of the cutter holder in FIG. 1.
FIG. 2B is an enlarged cross sectional side view of the cutter holder in FIG. 2A.
Figure 3:
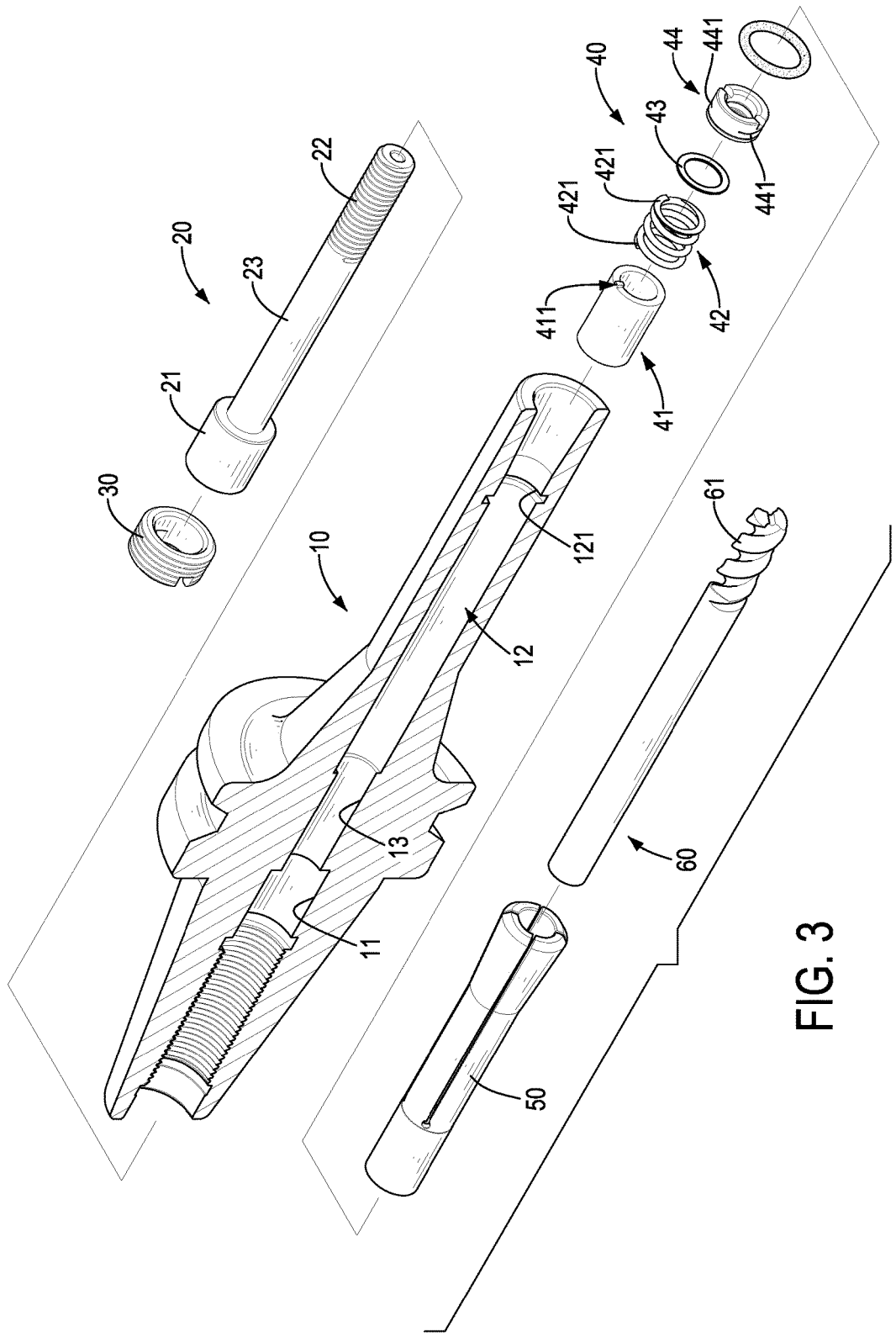
FIG. 3 is an exploded perspective view in partial section of the cutter holder in FIG. 1.

With reference to FIGS. 2A, 2B, and 3, the fastening bolt 20 has two opposite ends, a bolt head 21, a threaded section 22, and a smooth section 23. The bolt head 21 and the threaded section 22 are respectively disposed at the two ends of the fastening bolt 20. The smooth section 23 is disposed between the bolt head 21 and the threaded section 22. The fastening bolt 20 is inserted in the through hole 11 of the body 10 from the clamping end of the body 10. The bolt head 21 of the fastening bolt 20 abuts against a portion formed between the through hole 11 and the connecting hole 13. The threaded section 22 and the smooth section 23 are held in the receiving hole 12.

With reference to FIGS. 2A, 2B, and 3, the set screw 30 is inserted in the through hole 11 from the clamping end of the body 10 and is screwed with the inner thread of the through hole 11. The set screw 30 is used for preventing the fastening bolt 20 from dropping out from the through hole 11 and for limiting a stroke of the fastening bolt 20.

With reference to FIGS. 2A, 2B, and 3, the vibration absorbing structure 40 has a sleeve 41, an elastic unit 42, a spacer 43, and a set nut 44. The sleeve 41 is held in the receiving hole 12 of the body 10 and is mounted around the smooth section 23 of the fastening bolt 20.

Figure 4B:
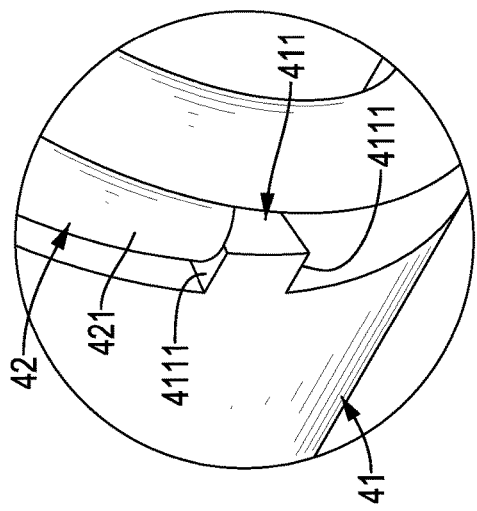
FIG. 4B is an enlarged cross sectional side view of the cutter holder in FIG. 2A.
Figure 4A:
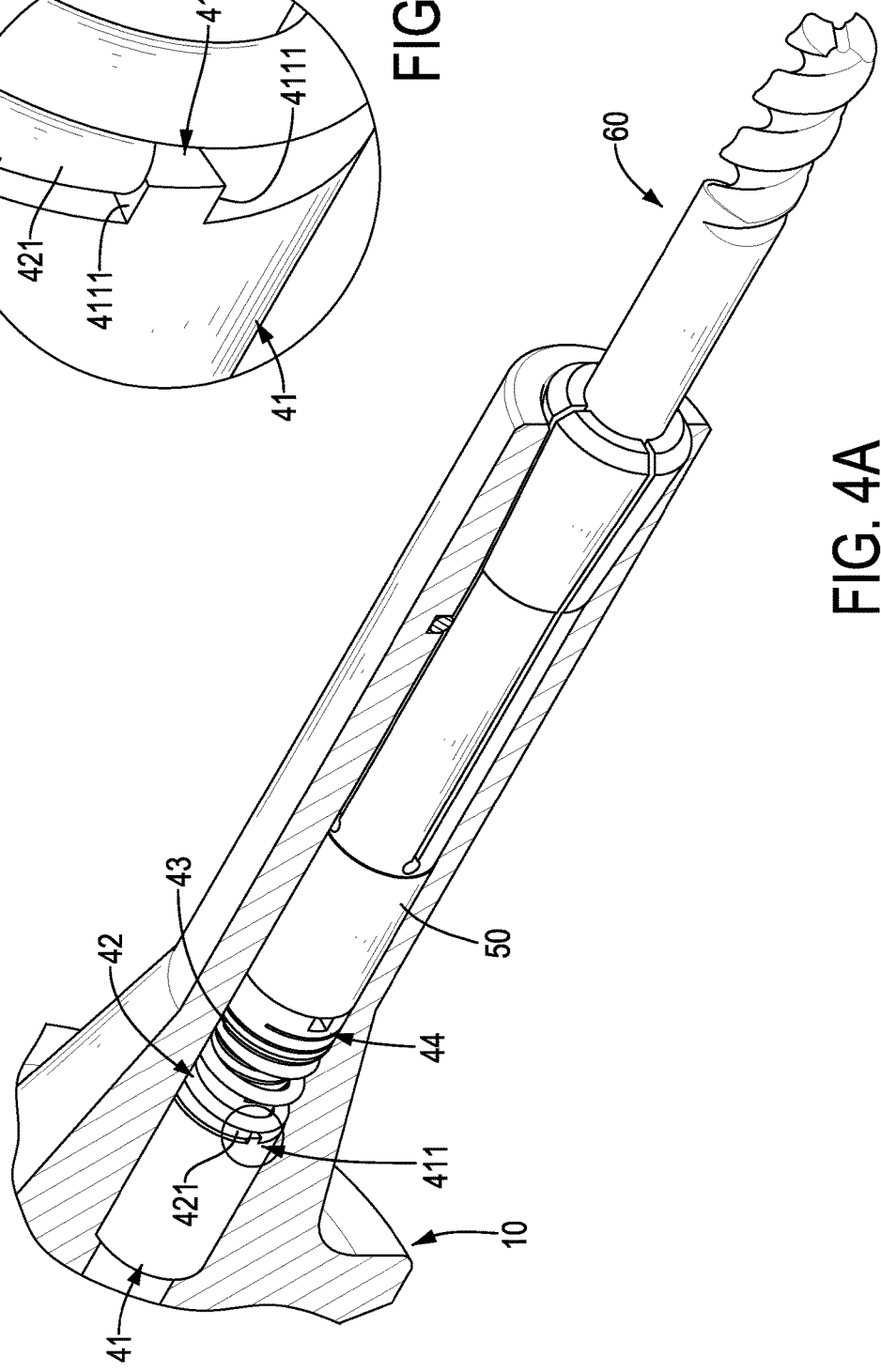
FIG. 4A is an enlarged side view in partial section of the cutter holder in FIG. 1.
Figure 5:
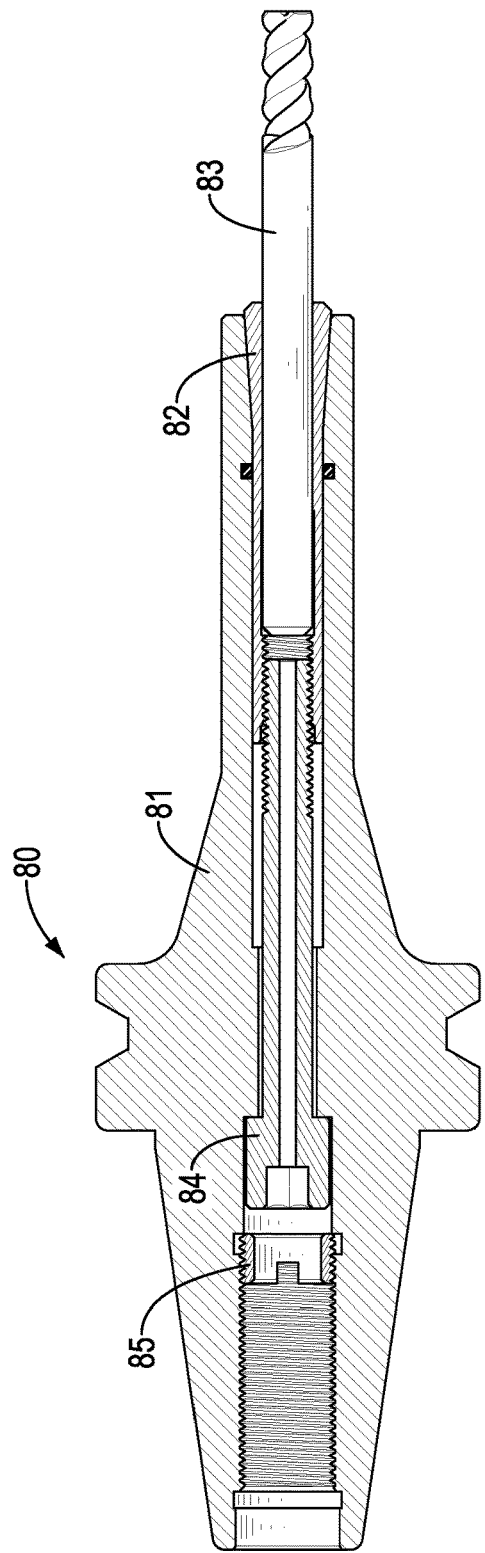
FIG. 5 is a side view in partial section of a conventional cutter holder.

With reference to FIGS. 3, 4A, and 4B, the sleeve 41 has a first end, a second end, and a positioning protrusion 411. The first end of the sleeve 41 faces to the cutting end of the body 10. The second end of the sleeve 41 faces to the clamping end of the body 10. The first end and the second end of the sleeve 41 are opposite each other. The positioning protrusion 411 is formed on and protrudes axially from the first end of the sleeve 41, extends toward the cutting end of the body 10 and has two opposite sides 4111. The sleeve 41 has a specific weight larger than the specific weight of the body 10, and more particularly the sleeve 41 is made of tungsten alloy. The elastic unit 42 has two opposite ends. The elastic unit 42 is mounted around the fastening bolt 20. One of the ends of the elastic unit 42 abuts against the sleeve 41.

With reference to FIGS. 3, 4A, and 4B, in the embodiment of the present invention, the elastic unit 42 is a compression spring. The elastic unit 42 has an outline of a spiral spring and two string ends 421. One of the two string ends 421 abuts against one of the two opposite sides 4111 of the positioning protrusion 411.

The spacer 43 is held in the receiving hole 12 and is mounted around the fastening bolt 20. The spacer 43 abuts against the other end of the elastic unit 42. The set nut 44 has an inner surface, an outer surface, an inner thread formed on the inner surface of the set nut 44, and multiple annular grooves 441. The annular grooves 441 are radially formed in the outer surface of the set nut 44 and extend to the inner surface of the set nut 44. The set nut 44 is held in the receiving hole 12, is screwed with the threaded section 22 of the fastening bolt 20, and abuts against the spacer 43. The set nut 44 screwed with the threaded section 22 can reciprocate toward the cutting end or the clamping end of the body 10.

With reference to FIGS. 1, 2A, 2B, and 3, the collet 50 has two opposite ends and is held in the receiving hole 12 of the body 10. One of the ends of the collet 50 extends out of the body 10. The other end of the collet 50 is screwed with the threaded section 22 of the fastening bolt 20.

With reference to FIGS. 4A and 4B, since one of the two string ends 421 of the elastic unit 42 is blocked by one of the two opposite sides 4111 of the positioning protrusion 411, the elastic unit 42 is able to be stably located between the sleeve 41 and spacer 43 abutted by the set nut 44. In addition, the elastic unit 42 does not easily rotate in the receiving hole 12. Therefore, the elastic unit 42 firmly abuts against both the sleeve 41 and the spacer 43. The sleeve 41 and the elastic unit 42 provide a good buffering effect and absorb vibration efficiently.

The set nut 44 is able to reciprocate toward the cutting end or the clamping end of the body 10 along the threaded section 22 of the fastening bolt 20, and can fine tune buffer capability of the cutter holder in accordance with the present invention according to the actual degree of vibration. The annular grooves 441 of the set nut 44 provide the set nut 44 with flexibility. The set nut 44 with annular grooves 441 facilitates vibration absorption of the cutter holder in accordance with the present invention.

With reference to FIGS. 1, 2A, 2B, and 3, the cutter 60 has two opposite ends and a cutting portion 61. The cutting portion 61 is formed at one of the ends of the cutter 60. The other end of the cutter 60 is mounted in the collet 50. The cutting portion 61 extends out of the collet 50.

The sleeve 41 is made of the material that has the larger specific weight than the body 10. The sleeve 41 and the elastic unit 42 are used for vibration absorption. The cutter holder in accordance with the present invention not only provides a smoother machined surface, diminishes the negative influence on the machining quality, but also resolves the noise problem caused by machining.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutter holder comprising:
    a body having
        a specific weight;
        a clamping end;
        a cutting end opposite the clamping end; and
        a receiving hole axially formed in the cutting end of the body;
    a fastening bolt mounted in the body and having
        a smooth section held in the receiving hole;
    a vibration absorbing structure mounted in the receiving hole and having
        a sleeve mounted around the smooth section of the fastening bolt and having
            a specific weight, the specific weight of the sleeve being larger than the specific weight of the body;
            a first end facing to the cutting end of the body;
            a second end facing to the clamping end of the body; and
            a positioning protrusion formed on and protruding axially from the first end of the sleeve and having two opposite sides;
        an elastic unit mounted around the fastening bolt and having two string ends, one of the two string ends of the elastic unit abutting against one of the two opposite sides of the positioning protrusion of the sleeve; and
        a set nut screwed with the fastening bolt and subjected to an elastic force provided by the elastic unit, the set nut having
            an inner surface;
            an outer surface; and
            multiple annular grooves formed in the outer surface of the set nut and extending to the inner surface of the set nut;
    a collet held in the receiving hole and having two opposite ends, one of the ends of the collet screwed with the fastening bolt; and
    a cutter mounted in the collet.

2. The cutter holder as claimed in claim 1, wherein the sleeve is made of tungsten alloy.

3. The cutter holder as claimed in claim 2, wherein the elastic unit is a compression spring.

4. The cutter holder as claimed in claim 3, wherein the vibration absorbing structure further has a spacer disposed between the elastic unit and the set nut.

5. The cutter holder as claimed in claim 4, wherein
    the body has
        a through hole axially formed in the body, extending from the clamping end of the body to the cutting end of the body, and having
            an inner surface; and an inner thread formed on the inner surface of the through hole and being adjacent to the clamping end of the body; and a set screw is screwed with the inner thread of the through hole.

6. The cutter holder as claimed in claim 5, wherein the receiving hole has an inner surface; and a receiving groove is annularly formed in the inner surface of the receiving hole and is adjacent to the cutting end of the body; and a seal is mounted in the receiving groove.

* * * * *